United States Patent
Blank et al.

[11] 3,764,195
[45] Oct. 9, 1973

[54] OPTICAL WAVEGUIDE DEVICES USING SINGLE-CRYSTAL GARNET FILMS

[75] Inventors: Stuart Lawrence Blank, Madison; Roy Conway LeCraw, Summit; Hyman Joseph Levinstein, Berkeley Heights; Ping King Tien, Chatham Twp., Morris County; Lawrence John Varnerin, Jr., Watchung; Stuart Harry Wemple, Chatham Twp., Morris County; Raymond Wolfe, New Providence, all of N.J.

[73] Assignee: Bell Telephone Laboratories, Incorporated, Murray Hill, N.J.

[22] Filed: Feb. 2, 1972

[21] Appl. No.: 222,779

[52] U.S. Cl. .......................... 350/96 WG, 350/150
[51] Int. Cl. ............................................. G02b 5/14
[58] Field of Search .............. 350/96 WG, 150, 151, 350/160

[56] References Cited
UNITED STATES PATENTS

| | | | |
|---|---|---|---|
| 3,674,335 | 7/1972 | Ashkin et al. | 350/96 WG |
| 3,586,872 | 6/1971 | Tien | 350/157 |
| 3,674,337 | 7/1972 | Marcatili | 350/96 WG |
| 3,655,261 | 4/1972 | Chang | 350/96 WG |
| 3,694,055 | 9/1972 | Bergman et al. | 350/147 |

OTHER PUBLICATIONS

"Magneto–Optical Properties of Garnet Ferrites in the Infrared Region" by Krinchik, et al., Soviet Phys. J.E.T.P., Vol. 13, No. 3 Sept. 1961 pg.509–511.

*Primary Examiner*—Ronald L. Wibert
*Assistant Examiner*—Paul K. Godwin
*Attorney*—W. L. Keefauver and Wilford L. Wisner

[57] ABSTRACT

Thin-film optical waveguides are disclosed comprising single-crystal rare-earth garnet films deposited on garnet substrates. Epitaxial film growth techniques, developed largely for magnetic bubble domain devices, provide films with superior optical properties either at visible or near-visible wavelengths. The thin-film optical waveguides are comprised of transparent garnet films of the general formula $R_3B_5O_{12}$; where R can be yttrium, lanthanum, bismuth, or a rare-earth ion with an atomic number of 60 to 71 inclusive, and B an be either magnetic, i.e., iron, or nonmagnetic, i.e., gallium or aluminum. The use of the former types of films can give rise to various thin-film magnetic devices suitable for integrated optical circuit arrangements. One such device which is disclosed, a thin-film magneto-optical switch and modulator, includes a light-guiding film of an iron garnet composition and a serpentine microcircuit which is deposited on the film to carry a switching current. The device provides a continuous switching of the polarization modes of the light waves guided in the film. Similarly, by applying a microwave current to the same circuit, the guided light can be modulated.

10 Claims, 5 Drawing Figures

United States Patent [19]

Blank et al.

OPTICAL WAVEGUIDE DEVICES USING SINGLE-CRYSTAL GARNET FILMS

BACKGROUND OF THE INVENTION

The present invention is concerned with thin-film optical circuit devices. More particularly, the invention is concerned with thin-film optical waveguides and associated optical devices utilizing garnet materials.

In proposed optical communication systems, it is desirable to have integrated optical circuit devices which function to guide and manipulate information-carrying light waves. This has led to much research on various thin-film optical waveguides and associated optical devices analogous to the rectangular waveguides or coaxial cables and associated devices of the lower frequency systems. The initial work in integrated optics has revealed that the eventual success of the proposed optical systems depends largely upon the development of thin-film materials which have suitable optical transmission properties and also which are suitable for the construction of devices involving the manipulation of the optically guided waves. For a general description of integrated optics and some description of many of the forms that the optical circuit devices may take, reference is made to *The Bell System Technical Journal*, Volume 48, Sept. 1969, pages 2059-2069.

Early efforts by workers in the art toward developing suitable optical materials involved the use of various crystalline materials for thin films, the most prominent of which were zinc oxide and zinc sulfide. Experiments have shown, however, that, due to the polycrystalline structure of the materials, thin films of zinc oxide and zinc sulfide have unreasonably high scattering losses for optically guided waves. Subsequent experiments on single-crystal films of materials such as gallium arsenide showed some improvement in scattering losses, but still showed unsatisfactorily high losses in the films due to large carrier concentrations in the materials. Moreover, the large refractive index of the gallium arsenide materials ($n \cong 3.6$) has made the application of the films to typical optical systems quite difficult.

Accordingly, effort in the art has continued toward the development of low loss optical materials suitable for the proposed thin-film devices.

SUMMARY OF THE INVENTION

Our invention is based primarily upon our recognition that various synthetic garnet materials, developed largely for use in magnetic bubble domain devices, have ideal optical and magnetic properties for integrated optical circuit arrangements. We have found that single-crystal rare-earth garnet thin films deposited on garnet substrates make ideal optical guides either at visible or near-visible wavelengths, with substantially lower scattering and absorption losses for optically guided waves as compared to prior art materials. We have also found that by employing magnetic garnet, i.e., iron garnet, materials in the thin guiding films, manipulation of the guided waves within the plane of the films is possible.

In our invention, we have taken advantage of the materials knowledge that has developed as the result of the recent interest in the area of technology commonly referred to as the bubble domain device art and have applied it to a different area of interest, namely, integrated optics. Specifically, we have found that thin guiding garnet films can be grown by appropriate techniques to be quite large in area, smooth, transparent, uniform in composition and thickness, and free from impurities. As a result, the thin guiding films embodied according to our invention have excellent overall optical properties.

In accordance with a feature of our invention, thin-film optical waveguides are comprised of transparent garnet films of the general formula $$R_3B_5O_{12},$$

where R can be yttrium, lanthanum or bismuth, or a rare-earth ion or a mixture of rare-earth ions with each other or with yttrium, lanthanum or bismuth, and B can be either iron, gallium or aluminum, or some mixture thereof with each other or with some other suitable element. The films can be grown by both conventional and new techniques. In either case, they are grown on lower index garnet substrates and have a thin dimension approximating the wavelength of the radiation to be propagated therein in a guided mode parallel to the plane of the film.

According to an additional feature of our invention, the use of magnetic, i.e., iron, garnet materials in the thin films can give rise to numerous thin-film magnetic devices useful in integrated optics. In an illustrative embodiment of the invention, a thin-film magneto-optical switch and modulator is described. The device consists of a thin guiding film or an iron garnet composition and a serpentine microcircuit which is deposited on the film to carry a switching current. By properly selecting the configuration of the circuit, the device provides a continuous switching of light waves propagating in the film in TE polarization modes to TM polarization modes, or vice versa. Similarly, by applying a microwave current to the same circuit, the guided light can be modulated.

BRIEF DESCRIPTION OF THE DRAWING

A more complete understanding of the foregoing and other features and advantages of our invention can be obtained from the following detailed description taken with reference to the accompanying drawing in which.

DETAILED DESCRIPTION OF THE ILLUSTRATIVE EMBODIMENTS

Figure 1:
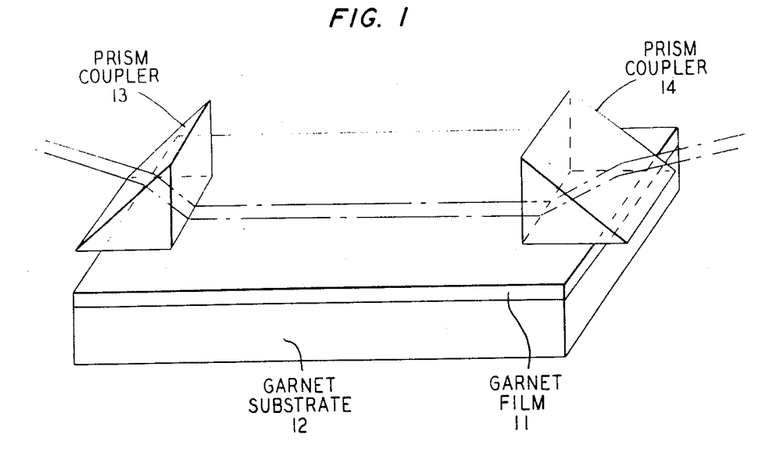
FIG. 1 is a perspective view of an embodiment of our invention.

In FIG. 1, a thin-film optical waveguide is shown in accordance with our invention consisting of film 11 of a transparent garnet material deposited on substrate 12 also of a transparent garnet material having a lower index of refraction than that of the film. Film 11 has a thickness approximating the wavelength of the radiation to be propagated therein, so that the radiation is effectively confined in that dimension by the dielectric discontinuities provided by the major surfaces of the film, i.e., the substrate/film and air-space/film interfaces. For the purposes of our invention, the thickness on the film may be anywhere within the range of 0.1 to 100 times the wavelength but is preferably between 1 and 10 times the wavelength. Propagation of the radiation in the two broad dimensions of the film is typically unrestricted.

Prism coupling means 13 and 14 are provided for introducing and extracting radiation in the film. The radiation is typically coherent with the wavelength in the optical range (which includes visible and near-visible wavelengths), and may be provided by any suitable source, e.g., a laser. Utilization apparatus not shown is typically positioned to receive the extracted radiation. Also means not shown can be provided for polarizing the incoming or outgoing radiation in embodiments in which polarized waves are utilized.

The particular coupling prisms 13 and 14, as depicted, are described in detail in Applied Physics Letters, Volume 14, page 291 (1969). Other means are available for performing the same function. Optical coupling and decoupling can be accomplished, for example, by means of an optical grating formed directly on the surface of the guiding film so as to be structurally integral therewith. Such a coupling arrangement, because of its reduction in bulk, is desirable for integrated optical circuit devices in which miniaturization and simplicity are important. The grating coupler is specifically shown in the embodiment of FIG. 3 of the drawing and is discussed in detail in a copending application of A. Ashkin and E. P. Ippen, Ser. No. 40,079, filed May 25, 1970 and assigned to the assignee hereof.

As indicated hereinabove, the garnet materials utilized in our invention are of the general formula $$R_3B_5O_{12}$$

where R can be yttrium, lanthanum or bismuth, or a rare-earth ion with an atomic number anywhere from 60 to 71, inclusive, or a mixture of rare-earth ions with each other or with yttrium, lanthanum or bismuth, and B can be either iron, gallium, or aluminum, or a mixture thereof with each other or with another suitable element. Basic varieties of garnet material useful in accordance with our invention were introduced as early as 1956 (See Compte-Rendus, Volume 42, page 382). Probably the best known garnet composition is yttrium iron garnet, $Y_3Fe_5O_{12}$, sometimes referred to simply as YIG. Because of their useful magnetic properties, the garnet materials have just recently been the subject of extensive theoretical and experimental work in connection with magnetic bubble domain devices. As a result of this work, growth habits for numerous varieties of garnets are now well understood. In addition, several techniques exist for growing both magnetic and non-magnetic garnet crystals with good dimensional characteristics and single-crystalline quality.

When grown by appropriate techniques, bulk single-crystal rare-earth gallium and aluminum garnets have been found to be substantially perfectly transparent in the entire optical wavelength range with negligible losses (scattering and absorption) for optically guided waves. These nonmagnetic garnets are therefore highly suitable for use in devices of the type illustrated in FIG. 1 of the drawing. Suitably grown rare-earth iron garnets have been found to have optical losses in the order of 0.1 dB/cm for guided waves in a wavelength range between 1.2 and 5.0 microns, and also have the added feature of useful magnetic properties. These losses in the iron garnet films are contrasted with losses as great as 60 dB/cm in similar zinc oxide films and 10 dB/cm in similar gallium arsenide films for the same wavelength range.

For optical guiding to take place in the embodiment of FIG. 1, it has been noted that the refractive index of film 11 must be larger than that of substrate 12. We have found, at a 1.52 micron laser wavelength, for example, that all the rare-earth iron garnet materials have a refractive index of $2.22 \pm .02$ and that those of the rare-earth gallium and aluminum garnets are approximately $1.94 \pm .02$ and $1.82 \pm .02$, respectively. The substitution or replacement of the rare-earth ions in the garnet compositions with other rare-earth ions typically has no effect on the refractive index of the material, but is useful for other purposes to be described below. It can be seen, therefore, that suitable arrangements for the embodiment of FIG. 1 would include iron garnet films deposited on gallium or aluminum garnet substrates, and gallium garnet films deposited on aluminum garnet substrates. It should also be possible to vary continuously the refractive index of the film and/or substrate by partial substitution for the rare-earth ions or the iron, gallium or aluminum ions in the garnet structure with other suitable ions which serve to raise or lower the refractive index of the material. For example, it has been found that compositions of the formula  $R_3Sc_2Al_3O_{12}$ have a refractive index of $1.87 \pm .02$ which is greater than that of the pure aluminum garnets. The flexibility that exists in the use of the garnet compositions in the thin-film light guides according to our invention should be readily apparent.

Although several techniques are available for producing the large garnet films of high perfection, epitaxial film growth techniques are probably best suited for the purposes of our invention. In such techniques, the films may be grown by a liquid phase epitaxy (LPE). Briefly, the growth takes place in a dipping apparatus, where a mechanically polished and chemically etched single-crystal garnet substrate is lowered into a melt at a temperature below 1000 degrees Centigrade containing an appropriate solution of rare-earth oxides and iron, gallium or aluminum oxides. The solvent used is a flux of about 98% PbO and 2% $B_2O_3$. The substrate crystals are usually grown to a large size from an almost stoichiometric melt by the well-known Czochralski technique.

A more detailed description of the LPE "dipping" technique preferably used in an invention and references to descriptions of various other epitaxial techniques are set forth in Applied Physics Letters, Volume 19, pages 486–488.

Since the substrate surface is very carefully polished both mechanically and chemically, the substrate/film interface is smooth and deposition in the LPE dipping technique takes place uniformly over the substrate surface producing a smooth, homogeneous, uniformly thick epitaxial film. The film thickness can be reproducibly chosen simply by controlling the duration of the growth process.

In the LPE dipping technique described above, it is necessary to match the lattice constants between the film and the substrate within approximately 0.01 to 0.02 angstroms (A.) to get films with good optical properties. This is relatively simple for garnet materials for two reasons. First of all, the garnet material is basically cubic in crystalline structure and there is therefore only one lattice parameter to match. Secondly, garnets of various rare-earth ions have a wide range of lattice constants. In fact, by partial or complete substitution of various rare-earth ions for the rare-earth ion in the garnet composition of the film or substrate, the lattice constant for the materials can be made continuously variable in a particular range. It is known that the size or ionic radius of the rare-earth ion decreases with an increase in its atomic number. It has been found that the increases in the lattice constant of the garnet material are substantially directly related to the increases in the ionic radius of the rare-earth ion. The garnet lattice constants, therefore, on the average, decrease with an increase in atomic number of the rare-earth ion.

Figure 2:
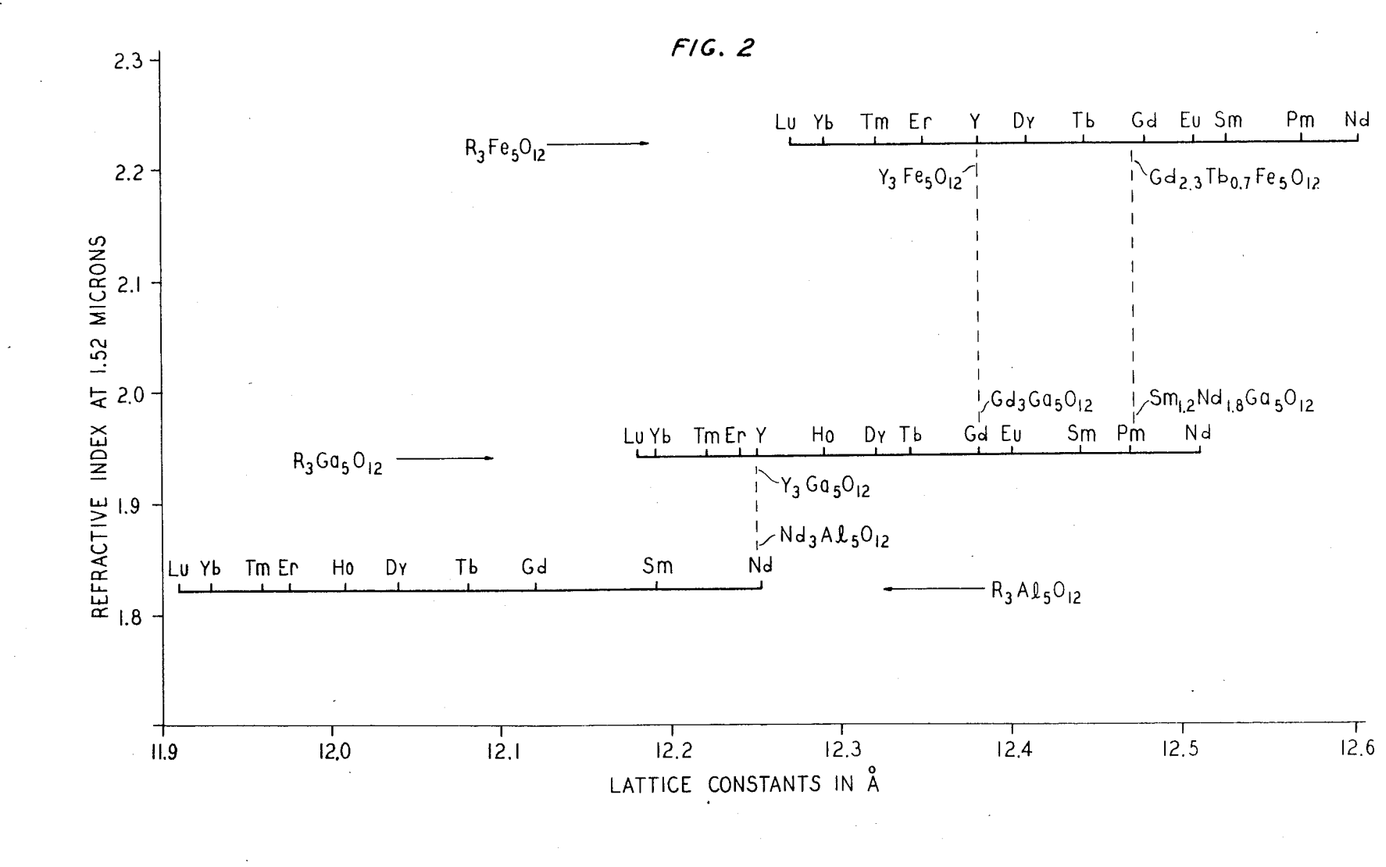
FIG. 2 is a diagram of the refractive index of various garnet compositions as a function of their lattice constant useful in selecting appropriate materials for use in embodiments of our invention.

To summarize some of the above-described characteristics of the garnet materials utilized in our invention, we have roughly plotted the refractive indices of various rare-earth compositions at the 1.52 micron laser wavelength as a function of their lattice constant in FIG. 2 of the drawing. This diagram should be helpful in selecting suitable garnet compositions for thin-film waveguides of the type illustrated in FIG. 1.

It is noted in FIG. 2 that the rare-earth iron garnets, the rare-earth gallium garnets and the rare-earth aluminum garnets occupy three distinct horizontal lines in the diagram representing the constant index of refraction of the materials as the rare-earth ion in the composition is changed. Starting with a composition including the rare-earth ion lutetium (Lu, atomic number = 71) at the extreme left of each line, the lattice constant of the garnet materials increases until the composition including the rare-earth ion neodymium (Nd, atomic number = 60) is reached at the extreme right of each line. Compositions including the yttrium ion (Y) have also been placed in the diagram.

To have a lattice match between the film and the substrate and therefore to satisfy the growth requirement, it is merely necessary to choose the garnet compositions for the film and the substrate from the same vertical line in the diagram. Also, to satisfy the optical guiding requirement by insuring that the refractive index of the film is greater than that of the substrate, it is merely necessary to choose the film material from vertically above the substrate material in the diagram. Where a selected vertical line falls intermediate to two rare-earth ions, the relative distance from the point where the line intersects the horizontal garnet lines is indicative of the relative proportion of the two ions required in the composition. As an example, the following compositions should be useful in embodiments of our invention:

| Film | Substrate |
|---|---|
| $Y_3Fe_5O_{12}$ | $Gd_3Ga_5O_{12}$ |
| $Y_3Ga_5O_{12}$ | $Nd_3Al_5O_{12}$ |
| $Gd_{1.3}Tb_{0.7}Fe_5O_{12}$ | $Sn_{1.3}Nd_{1.8}Ga_5O_{12}$ |

Placement of the partially substituted garnets such as $R_3Sc_2Al_3O_{12}$ between the three horizontal lines of the diagram should also be possible in more detailed representations.

To demonstrate the optical properties of garnet films, we have grown, fabricated and tested several embodiments of the type illustrated in FIG. 1 using various garnet compositions. Specifically, one of our experiments involved the use of a $Eu_3Ga_5O_{12}$ film on a $Gd_3Sc_2Al_3O_{12}$ substrate. The lattice constant of the $Eu_3Ga_5O_{12}$ material is equal to 12.400 A. and matches closely to that of the $Gd_3Sc_2Al_3O_{12}$ material which is equal to 12.395 A. The film was grown by the epitaxial film technique described above on the polished substrate of about 2 cm in length to a thickness of about 2.4 microns. The film was found to be transparent, smooth, uniform in composition and thickness, and free from pin-holes. A 0.6328 micron He—Ne laser beam was fed into one end of the film by a rutile prism coupler. Photographs showed that the light beam propagated through the entire film and then re-entered the airspace at the opposite edge leaving a bright spot at that point. Similar photographs for polycrystalline or amorphous film always show a large number of bright spots distributed randomly in the vicinity of the path of propagation of the beam in the films. In our experiments, rather remarkably, the complete absence of these spots indicated the superior optical quality of garnet films.

We have also observed in this experiment six, five, four and two propagating TE polarization modes at the 0.4880, 0.5145, 0.6328 and 1.064 micron laser wavelengths, respectively, in the film. Based on the measured synchronous angles, we determined the refractive indices of the film to be 1.9903, 1.9824, 1.9667 and 1.9408, respectively, at the above laser wavelengths. The corresponding refractive indices of the substrate were determined to be 1.9295, 1.9208, 1.9098 and 1.8915, respectively. Substantially identical indices were observed for the TM polarization modes in the film.

The optical loss in the film was determined by the experiment to be approximately 5 dB/cm and almost all due to absorption losses. We have found that the loss can be substantially reduced by eliminating impurity ions in the crystal.

The pure iron garnet materials which can be utilized in our invention are ferrimagnetic in that the magnetic moment of the ferric ions in the octahedral lattice sites of the garnet crystalline structure is opposite to that of the ions in the tetrahedral lattice sites. Since each garnet formula unit includes two octahedral and three tetrahedral ferric ions, the net magnetic moment is equivalent to one ferric ion per unit. By replacing the ferric ions in one of the lattice sites by nonmagnetic ions, the magnetic moment in that site is reduced. For example, by partially substituting gallium ions for the ferric ions in a $Y_3Ga_xFe_{5-x}O_{12}$ composition, the number of ferric ions in tetrahedral sites is reduced, while those in the octahedral sites are relatively unaffected. Hence, by increasing the value of $x$ in the iron-gallium system, the rotary dispersion of the composition can be made from positive to negative. Garnet materials can therefore be made to have a relatively large Faraday rotation but a small net magnetic moment or magnetization (e.g., by substituting 25 percent of the tetrahedral ferric ions with gallium in $Y_3Fe_5O_{12}$, the saturation magnetization is reduced from 1770 gauss ($Y_3Fe_5O_{12}$) to 270 gauss, while the reduction in Faraday rotation is from 172°/cm ($Y_3Fe_5O_{12}$) to 112°/cm). We have found that such properties are important for thin-film optical switches and modulation devices embodied according to our invention such as that illustrated in FIG. 3 of the drawing. In general, the degree of modulation in the devices depends upon the Faraday rotation and the magnetization determines the rf power required for switching or modulation.

Figure 3:
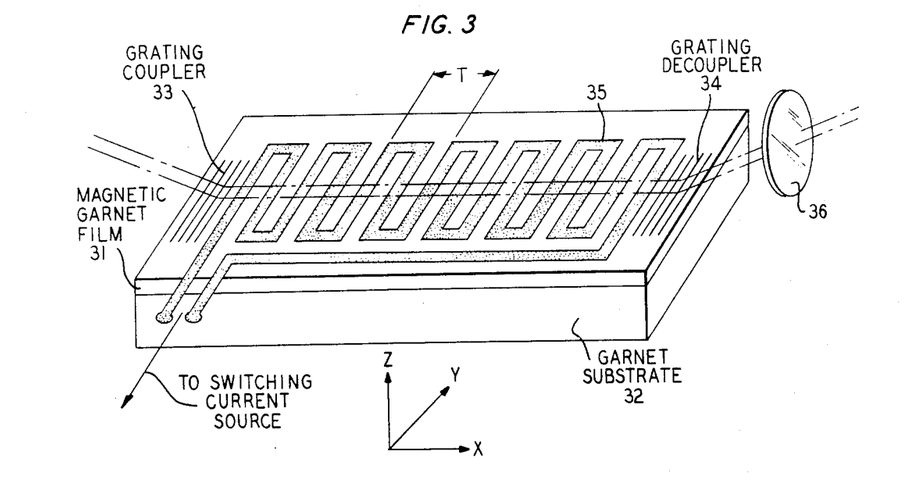
FIG. 3 is a perspective view of a thin-film magneto-optical switch and modulator embodied in accordance with our invention.

In FIG. 3, there is illustrated a thin-film magneto-optical switch and modulator which could serve as an important building block for more sophisticated devices in integrated optics. To our knowledge, this device is the first thin-film magnetic device proposed for optically guided waves.

Specifically, the device of FIG. 3 consists of a transparent magnetic garnet thin-film 31, which may be a pure iron garnet or, more preferably, a gallium compensated iron garnet material, deposited on lower refractive index garnet substrate 32. Grating couplers 33 and 34 are provided for coupling a laser beam into and out of film 31. A serpentine microcircuit 35 is deposited on the upper surface of film 31 and connected to a suitable source of switching current. Between couplers 33 and 34 the light can propagate in the film as either a TE polarization wave or TM polarization wave. Polarization analyzer 36 is positioned to intercept the light beam coupled out of the film by coupler 34 and to select out either the TM mode or the TE mode.

When a current is fed into circuit 35, the currents carried by any two neighboring wires in the circuit are opposite in direction so as to produce in their vicinity a spatially alternating magnetizing field along the direction of light propagation in the film. The magnetization in magnetic garnet film 11 then assumes a corresponding spatially alternating domain structure. By properly selecting the period of circuit 35, an input TE wave is continually converted to a TM wave in a critical length of the film. Alternatively, an input TM wave can be continuously converted to a TE wave. When the current in circuit 35 is off, the domains in film 31 are relaxed to their original pattern and the net magneto-optical effect is washed out. By passing the laser beam coupled out of film 11 through analyzer 36, the device operates as an optical switch. Similarly, by applying a microwave modulation current to circuit 35, the light passing through analyzer 36 is modulated.

The iron garnet materials useful in film 31 of FIG. 3 can be grown with their easy axis of magnetization either parallel or normal to the plane of the film. Magnetic anisotropy can be induced during growth of the films by having a slight mismatch in the lattice constants and a differential in the thermal expansion coefficient between the magnetic garnet film and the garnet substrate. Moreover, if the normal magnetostriction coefficient for the garnet material is positive, a tensile stress applied to the film tends to make the easy axis parallel to the film. Likewise, if the normal magnetostriction coefficient is negative, the tensile stress tends to make the easy axis normal to the film.

In explaining the operation of the embodiment of FIG. 3 in more detail, we will consider two separate cases. In the first case, the easy axis in iron garnet film 11 is parallel to the plane of the film and the applied current in circuit 35 tends to magnetize the film in the direction of the light beam propagation. In the second case, the easy axis in film 11 is normal to the film and the applied current tends to magnetize the film in the direction normal to the light beam propagation.

In both cases, the coordinate system illustrated in FIG. 3 will be used. In such a coordinate system, a TE wave contains the field components, $E_y$, $H_z$ and $H_x$ only, while a TM wave contains the field components, $H_y$, $E_z$ and $E_x$ only. The light beam is assumed to be infinitely wide in the $y$ direction so that a one-dimensional approximation, $(d/dy) = 0$, may be applied. We use the subscripts 0, 1 and 2 for the substrate, the film, and the air-space above the film, respectively, and (0), (1), (2), ... (n), for the orders of the waveguide modes. $A(x)$ and $B(x)$ are respectively the amplitudes of the TE and TM waves, and they vary slowly in $x$ because of the magneto-optical effect. Wherever some confusion may arise, we add a subscript E for the TE waves and M for the TM waves.

Let $\mu$ and $\epsilon$ be the magnetic and the dielectric permeability in free space. Then the free-space phase constant is $k = \omega(\mu\epsilon)^{1/2}$, where $\omega$ is the laser angular frequency. It is convenient to take $Z = W$ and $Z = 0$ as the upper and lower surfaces of the film. The fields of the normal modes in a thin-film waveguide can now be written in the following forms:

For the mth order TE mode, we have $$E_y = A_{(m)}(x) \cos(b_{(m)E}z - \Phi_{10(m)E}) \exp[-i\omega t + i\beta_{(m)E}x] \quad (1)$$

$$H_x = (-i\omega\mu)^{-1} d/d\dot{Z}(E_y) \quad (2)$$

$$H_z = (i\omega\mu)^{-1} d/dX(E_y) \quad (3)$$

where $$b_{(m)E}^2 = (kn_1)^2 - \beta_{(m)E}^2 \quad (4)$$

$$p_{(m)E}^2 = \beta_{(m)E}^2 - (kn_o)^2 \quad (5)$$

and $$\tan \Phi_{10(m)E} = p_{(m)E}/b_{(m)E} \quad (6)$$

Similarly for the mth order TM mode, we may write $$E_z = B_{(m)}(x) \cos(b_{(m)M}z - \Phi_{10(m)M}) \exp[-i\omega t + i\beta_{(m)M}x] \quad (7)$$

$$E_x = -[(d/dZ)H_y/(d/dX)H_y] E_z \quad (8)$$

$$(d/dX) H_y = -i\omega\epsilon n_1^2 E_z \quad (9)$$

where $$b_{(m)M}^2 = (kn_1)^2 - \beta_{(m)M}^2 \quad (10)$$

$$p_{(m)M}^2 = \beta_{(m)M}^2 - (kn_o)^2 \quad (11)$$

$$\tan \Phi_{10(m)M} = (n_1/n_0)^2 \, p_{(m)M}/b_{(m)M} \quad (12)$$

In deriving the above expressions for the normal modes, we have ignored linear and rotary magnetic birefringence in the film, and hence, the film has a refractive index $n_1$ and the substrate $n_o$. So far, all the materials have been considered to be optically isotropic.

For our first case, the magnetization in the film is in the $x$ direction. To include the rotary birefringence of the film, we introduce a dielectric tensor which relates the electric displacement to the electric field in the Maxwell equations according to $$\begin{vmatrix} D_z \\ D_y \\ D_x \end{vmatrix} = \epsilon \begin{vmatrix} n_1^2 & -i\delta & 0 \\ i\delta & n_1^2 & 0 \\ 0 & 0 & n_1^2 \end{vmatrix} \cdot \begin{vmatrix} E_z \\ E_y \\ E_x \end{vmatrix} \quad (13)$$

where $\gamma$ can be converted into the Faraday rotation, $\theta$, by $$\theta = \tfrac{1}{2}(k\gamma/n_1) \quad (14)$$

Figure 4:
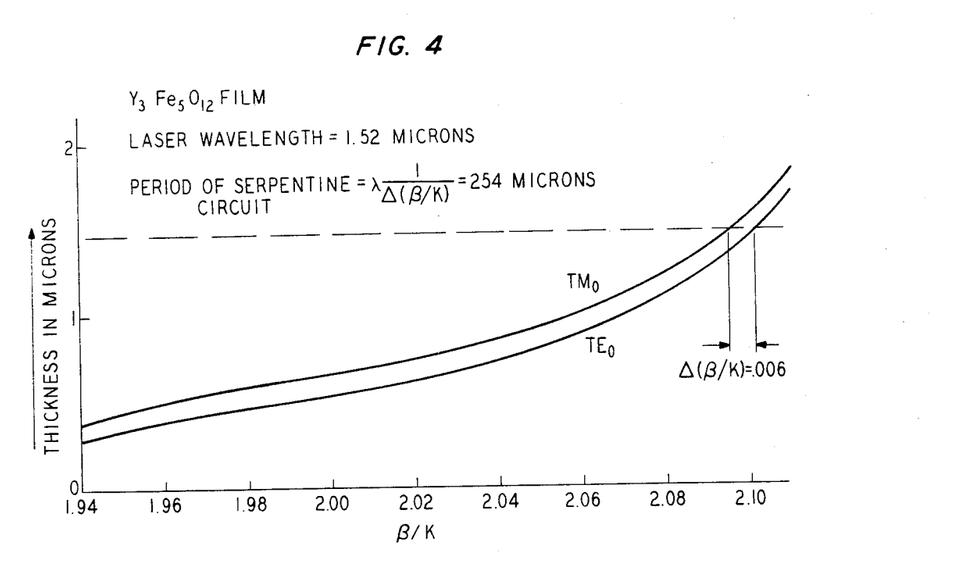
FIG. 4 is a plot of film thicknesses as a function of the parameter $\beta/k$ illustrating the relationship between these parameters for an illustrative film.

Substituting Equation (13) into the Maxwell equations and using the condition, $d/dy = 0$, we now find that the $E_y$ of the TE wave can be coupled to the $E_z$ of the TM wave. After some algebra work, it is shown that $$\beta_{(m)E}(d/dX)A_{(m)}(x) =$$
$$(kn_1)^2\,([\delta/n_1^2])\,F_{(m)(m')}\,B_{(m')}(x)\,\exp[i(\beta_{(m')M}-\beta_{(m)E})x] \quad (15)$$

and $$\beta_{(m)M}(d/dX)B_{(m)}(x) =$$
$$-\beta(m')M^2\,([\delta/n_1^2])\,F_{(m)(m)}\,A_{(m)}(x)\,\exp[i(\beta_{(m)E}-\beta_{(m')M})x] \quad (16)$$

where $$F_{(m)(m')} = \frac{\int_0^W E_{y(m)} E_{z(m')}\,dZ}{\int_{-\infty}^{+\infty} E^2_{y(m)}\,dZ \int_{-\infty}^{+\infty} E^2_{z(m)}\,dZ} \quad (17)$$

which is the filling factor indicating that the coupling between the $TE_{(m)}$ and $TM_{(m')}$ modes depends upon their relative field distributions in Z. It is immediately obvious from Equations (15) and (16) that the coupling is not effective unless $\beta_{(m)E} = \beta_{(m')M}$; they are the phase constants of the $TE_{(m)}$ and $TM_{(m')}$ waves, respectively, considered hereinabove. Except for a very small linear and rotationary dispersion, the garnet materials are basically cubic in structure and $\beta_{(m)E}$ cannot be made to equal $\beta_{(m')M}$. This is evident from FIG. 4 of the drawing. There, a plot of film thickness as a function of $\beta/k$ for an illustrative material such as $Y_3Fe_5O_{12}$ shows two distinct curves for $TE_{(0)}$ waves and $TM_{(0)}$ waves propagating in the film. The waves propagate in the film with different wave velocities since the fields at the two major film surfaces necessary for matching the boundary conditions are $E_y$ and $H_x$ in the TE wave case and $H_y$ and $E_x$ in the TM wave case, respectively. An attempted conversion of the TE wave into a TM wave will be small since the converted TM wave has a phase which does not synchronize with that of the TE wave from which it is generated. Therefore the device considered will not work unless a serpentine type of magnetizing circuit such as circuit 35 is provided.

The period of circuit 35 is chosen such that $\gamma$ in the dielectric tensor of Equation (13) assumes the form of $$\delta = \delta_0 \cos(\beta_{(m)E} - \beta_{(m')M})z \quad (18)$$

Such a circuit forces the magnetization into the plane of the magnetic film and thus provides a Faraday rotation in the film that is varying in $x$ at a phase which is the phase difference between the TE and TM waves as shown in Equation (18). This newly introduced phase added to the phase of the converted TM wave gives a resultant phase which synchronizes with that of the TE wave. This enables a complete and effective mode conversion in the film.

Substituting Equation (18) into Equations (15) and (16) and using appropriate initial conditions, we have $$A_m = A(o)\cos[\tfrac{1}{2}(\beta_{(m')M}/\beta_{(m)E})\,(k\delta_0/n_1)\,F_{(m)(m')}x] \quad (19)$$

$$B_m = [\beta_{(m')M}/kn_1]A(0)\sin[\tfrac{1}{2}(\beta_{(m')M}/\beta_{(m)E})\,(k\delta_0/n_1)\,F_{(m)(m')}x] \quad (20)$$

It is therefore seen that an input $TE_{(m)}$ wave is completely converted into a $TM_{(m')}$ wave in a critical distance in the film of $$l = 2\,(\beta_{(m)E}/\beta_{(m')M})\,(n_1/k\delta_0)\,(F_{(m)(m')})^{-1} \quad (21)$$

For our second case, the magnetization in the film is in the z direction normal to the film, and the dielectric tensor involves the relation $$\begin{vmatrix} D_x \\ D_y \\ D_z \end{vmatrix} = \epsilon \begin{vmatrix} n_1^2 & -i\delta & 0 \\ i\delta & n_1^2 & 0 \\ 0 & 0 & n_1^2 \end{vmatrix} \cdot \begin{vmatrix} E_x \\ E_y \\ E_z \end{vmatrix} \quad (22)$$

In this case, magneto-optical effect couples the $E_y$ field of the TE wave to the $E_x$ field of the TM wave. After a calculation similar to that set forth hereinabove for our first case, we find the critical length for complete conversion from a TE wave to a TM wave is $$l = 2\,(\beta_{(m)E}1/2\,\beta_{(m')M}1/2/b_{(m')M})\,(n_1/k\delta_0)\,(F_{(m)(m')})^{-1} \quad (23)$$

As a specific example of the embodiment of FIG. 3, consider a $Y_3Fe_5O_{12}$ film of a thickness 1.5 microns on a $Gd_3Ga_5O_{12}$ substrate. Let the easy axis of magnetization be in the plane of the film so that the calculations set forth hereinabove for our first case are applicable. At a 1.52 micron laser wavelength, $n_z = 1.000$, $n_1 =$ 2.1400, and $n_0 = 1.9400$. We shall consider the fundamental modes for both TE and TM waves so that $m = m' = 0$, and $F_{(0)(0)} \cong 1$. To ascertain the period of the serpentine microcircuit required in our example, we look to a plot of film thickness as a function of $\beta/k$ for the film material for both the $TE_{(0)}$ waves and the $TM_{(0)}$ waves such as shown in FIG. 4. For a film thickness of 1.5 microns, we find from FIG. 4 that $$(\beta_{(0)E} - \beta_{(0)M})/k = \Delta(\beta/k) = .006.$$

The period of the microcircuit is then given by $$T = \lambda[1/\Delta(\beta/k)] \qquad (24)$$

For this example, $\lambda = 1.52$ microns and $T = 254$ microns. For the $Y_3Fe_5O_{12}$ film, the Faraday rotation is $\theta = 1\ 72°/cm$. It can be shown that a critical length $l$ of approximately 5 millimeters is required for a complete conversion from TE wave to TM wave.

Numerous variations and modifications of the embodiments described hereinabove can be made by one skilled in the art without departing from the scope of our invention. For example, since a metallic microcircuit of the type illustrated in FIG. 3 formed directly on the iron garnet film may introduce additional losses to the light wave propagation therein, we may coat the film with another layer of dielectric material of a lower refractive index and fabricate the circuit on it. Alternatively, the circuit may be deposited on a separate glass substrate which is then positioned above the iron garnet film leaving a uniform air gap of several microns between the garnet film and the circuit. It may also be possible to superimpose a second serpentine circuit with a slightly different period on circuit 35 shown in FIG. 3. When the current in circuit 35 is off, it can be shifted into the second circuit. The swithing action then involves only minute motions of the domain walls in the film so that the magnetizing field required to produce these motions can be minimized.

Figure 5:
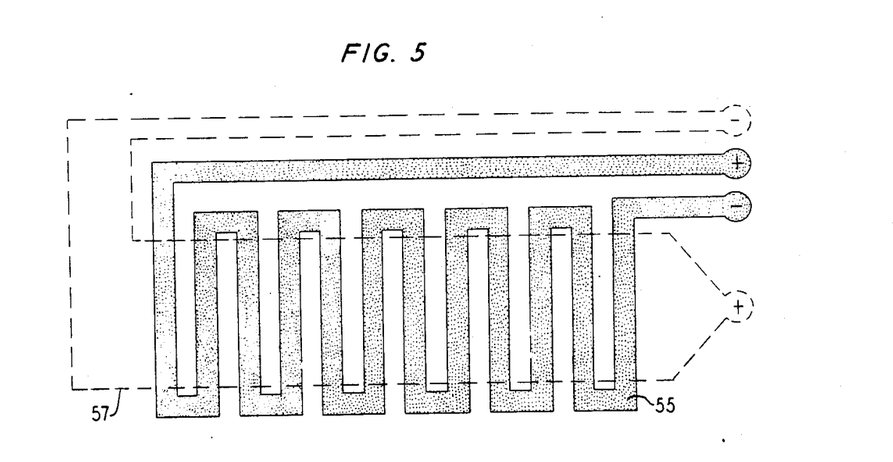
FIG. 5 is a view of a modified microcircuit arrangement useful in embodiments of our invention.

Furthermore, for modulation of the light in the embodiment of FIG. 3, it is probably preferable to utilize microcircuits of the type shown in FIG. 5 of the drawing. Here, with the easy axis parallel to the plane of the film, a dc current fed into dotted circuit 57 will function to magnetize the film in one of the easy directions parallel to the film. Then a microwave current fed into solid circuit 55 tends to tilt the magnetization into another easy direction which is parallel to the direction of light wave propagation and produce a magneto-optical coupling that varies with the applied microwave frequency.

In still another variation of the embodiments described hereinabove, it may be possible to obtain gain in the garnet films as the light beam propagates therein. Laser oscillations at 2.09 microns have been previously observed in $Y_3Fe_5O_{12}$ materials doped with the holmium ion and pumped by a tungsten lamp. It has been shown that the laser efficiency can be further improved by adding erbium and thulium ions. For example, therefore, a $Y_3Fe_5O_{12}$ film doped with 5% $Er^{+3}$, 5% $Tm^{+3}$, and 2% $Ho^{+3}$ in the magneto-optical switch of FIG. 3 will serve to switch or modulate the light as well as provide electronic gain in the medium.

Although the foregoing description of our invention has been directed to a limited number of embodiments, it should be understood and appreciated that the scope of the appended claims encompasses all modifications and variations of thin-film optical devices utilizing transparent garnet materials. The optimum arrangement of parameters, dimensions and conditions in each particular case are best determined experimentally in accordance with the basic principles set forth hereinabove.

We claim:

1. A thin-film device for guiding a beam of optical electro-magnetic radiation comprising:
   a first body of an optically transparent garnet crystalline material forming a substrate for a second body of optically transparent garnet crystalline material having a higher refractive index than that of said first body;
   the garnet crystalline materials of said first and second bodies being monocrystalline compositions of the general formula $$R_3B_5O_{12}$$

where R is an ion selected from the group consisting of yttrium, lanthanum, bismuth and the rare-earth ions with an atomic number of 60 to 71 inclusive, and where B is an ion selected from the group consisting of iron, gallium and aluminum;
   said second body having two substantially smooth major surfaces separated by a distance of the order of the wavelength of the radiation to be guided therein, one of said surfaces forming an interface with said first body;
   means for launching the beam into said second body in a guided mode propagating substantially parallel to said major surfaces; and
   means for extracting the beam from the guided mode in said second body.

2. A device according to claim 1 in combination with means for polarizing the beam launched into said second body and means for analyzing the beam extracted from said second body.

3. A device according to claim 2 in which the garnet crystalline material of said second body is an iron-containing ferrimagnetic garnet composition.

4. A device according to claim 3 in combination with means for applying a spatially alternating magnetic field to said second body of a selected period to produce a spatially periodic variation in the magnetization of said second body in the direction of the propagation of the beam.

5. A device according to claim 4 in which said magnetic field applying means is a serpentine microcircuit formed on one of said major surfaces of said second body for carrying an inductive electrical current sufficient to produce said spatially alternating magnetic field.

6. A device according to claim 5 in which the electrical current is a dc current for continuously switching the polarization modes of the guided beam propagating in said second body.

7. A device according to claim 5 in which the electrical current is a variable-frequency microwave current for modulating the guided beam in accordance with the applied microwave frequency.

8. A device according to claim 7 in which the easy axis of magnetization of said ferrimagnetic garnet material is in a direction parallel to said major surfaces of said second body.

9. A device according to claim 8 in combination with magnetizing means for tilting the magnetization of the ferrimagnetic garnet material into the hard direction normal to said major surfaces of said second body and in which said serpentine microcircuit tends to tilt the magnetization into the easy direction parallel to said major surfaces.

10. A device according to claim 4 in which the ferrimagnetic garnet material is doped with suitable ions to provide electronic gain at the wavelength of the radiation propagating therein.

* * * * *